United States Patent [19]
Janssen

[11] 3,739,854
[45] June 19, 1973

[54] DEVICE FOR HARVESTING CABBAGE

[76] Inventor: Wilhelmus Henricus Johannes Janssen, Scheepvaartweg 3, Roermond, Netherlands

[22] Filed: June 7, 1971

[21] Appl. No.: 150,577

[30] Foreign Application Priority Data
Sept. 10, 1970 Netherlands............... 7013448

[52] U.S. Cl. ............................................. 171/61
[51] Int. Cl. ............................................. A01d 25/00
[58] Field of Search ............... 171/61, 62, 38, 37; 56/119, 317, 327 R, 14.2

[56] References Cited
UNITED STATES PATENTS

| | | | |
|---|---|---|---|
| 1,190,598 | 7/1916 | Sierup | 171/61 |
| 2,663,983 | 12/1953 | Fergason | 56/14.2 |
| 634,873 | 10/1899 | Brown | 171/61 |
| 3,426,515 | 2/1969 | Boyer | 56/327 R |
| 3,497,013 | 2/1970 | Baker | 171/38 |
| 1,124,406 | 1/1915 | Feverstein | 171/38 |
| 2,833,357 | 5/1958 | Lust | 171/37 |

Primary Examiner—Antonio F. Guida
Attorney—Marechal, Biebel, French & Bugg

[57] ABSTRACT

A device for harvesting cabbages and other similar crops includes a frame carrying two endless conveyors arranged in side by side relation, the conveyors being provided with interleaved projections into which the stems of the crop are directed. The conveyors are inclined upwardly in a direction from the front to the rear of the device. The crop heads are directed onto a guide plate which also tapers up-wardly at a greater angle than the conveyors. The conveyor moves at the same rate as the frame, but in the opposite direction so that the stems are pulled perpendicularly out of the soil where they are then severed from the cabbage head. The severed heads are displaced to the rear of the device with the aid of a second conveyor while the stems may be returned to the ground.

11 Claims, 5 Drawing Figures

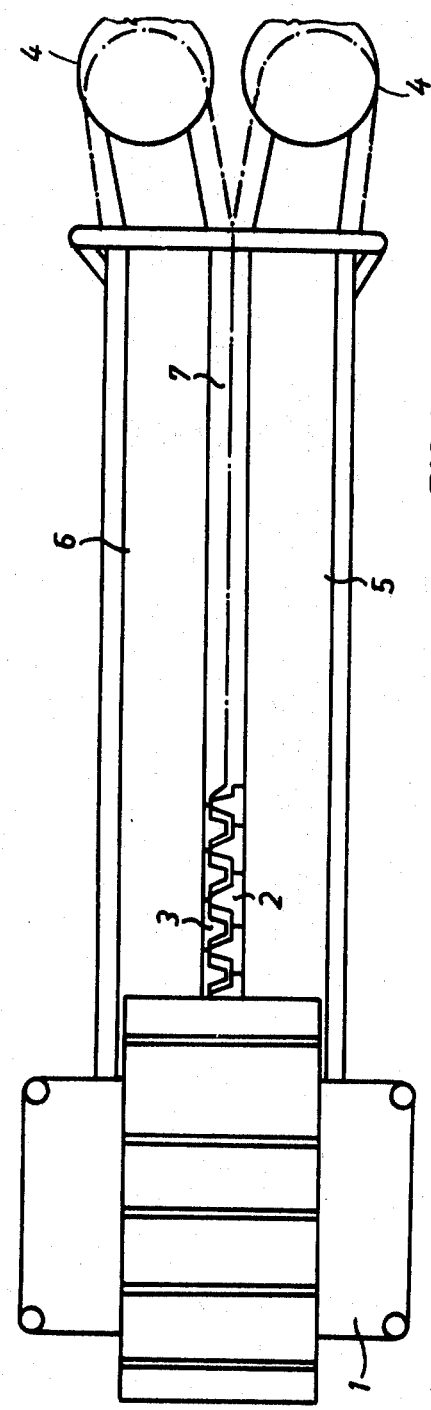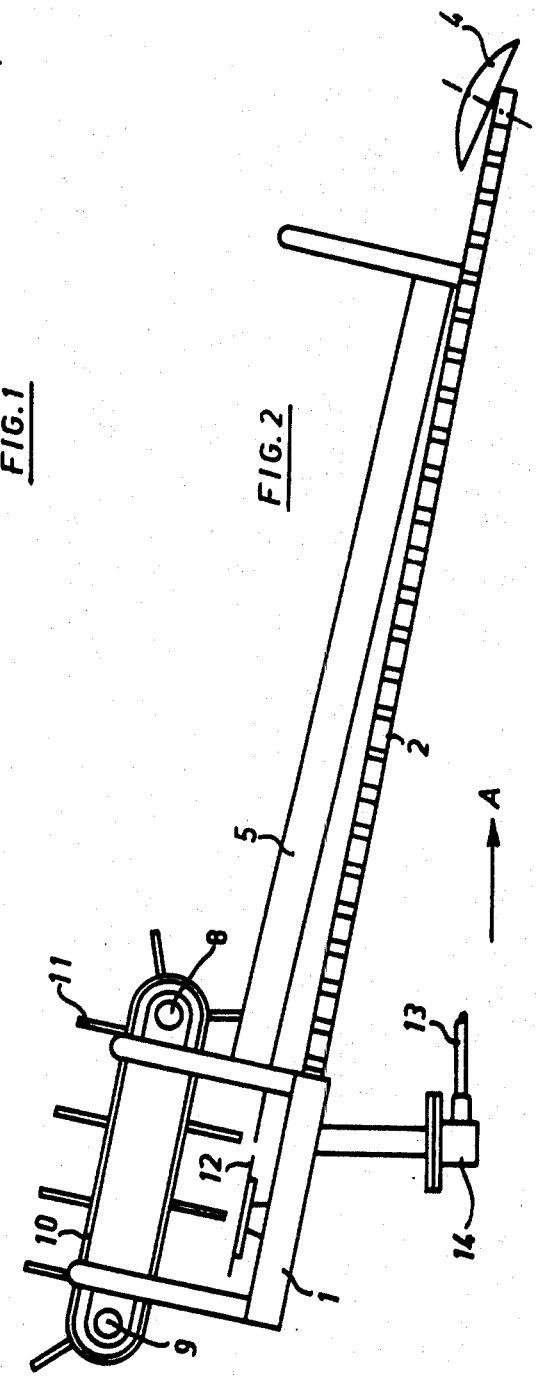

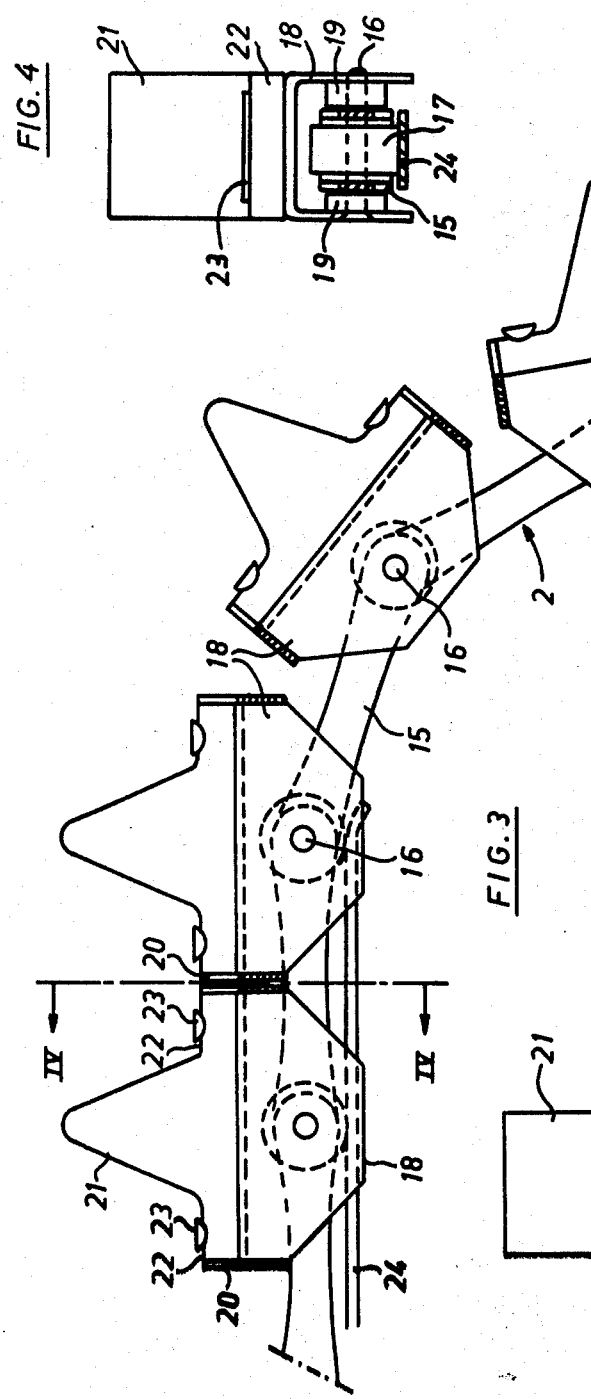

DEVICE FOR HARVESTING CABBAGE

The invention relates to a device for harvesting cabbage and suchlike crops growing on stems.

The invention has for its object to provide such a device with the aid of which cabbage and suchlike crops can be harvested in an efficacious and economic manner.

According to the invention there is provided a device for harvesting cabbages and suchlike crops growing on stems, the device comprising a frame carrying two endless conveyors ranged side by side and adapted to cooperate with each other and being inclined upwardly in a direction from the front to the rear of the device, the conveyors being provided with inter-engaging projections, guide means for the crop heads being arranged above the conveyors, said guide means being at a greater angle to the horizontal than the conveyors.

By means of this device, in operation, the stems can be gripped by the conveyors and be gradually pulled out of the soil, whilst owing to the difference between the angles of inclination of the guide and the chains the cabbage plant can be drawn against the guide by its lower side so that the plants invariably follow a given path across the device. It is effective to arrange at the end of the guide at the same level as the lower side of the guide a knife for severing the cabbage head from the stem.

The conveyors are preferably provided with tines coupled with the conveying members so as to be relatively independently pivotable. Owing to this pivotal arrangement of the tines no undesirable forces will occur in the conveyors and between the tines themselves, for example, near the turns of the endless conveyors. Since these undesirable forces are avoided, high power is not required for driving the conveyors. Damaged tines can be readily replaced by new ones and it is furthermore possible to replace given tines by tines of a different profile.

The conveyors are preferably formed by endless chains and the tines may be provided with stops which are at least substantially in contact with the links along straight portions of the chain. Thus, in a simple manner I avoid the opposite chain portions being urged away from each other by the cabbage stems, in which case they would loosen their grip on the stems. When using chains it is furthermore possible to cause rollers of the chains to run along guides, which also prevents the relatively cooperating chain portions from being urged away from each other.

In order that the invention may be more clearly understood, some embodiments thereof will now be described, by way of example, with reference to the accompanying drawings, in which:

FIG. 1 is a schematic plan view of a device embodying the invention;

FIG. 2 is a schematic side elevation of the device of FIG. 1;

FIG. 3 is a plan view of part of an endless conveyor;

FIG. 4 is a sectional view taken on the line IV—IV in FIG. 3; and

FIG. 5 is a sectional view similar to FIG. 4, but of an endless conveyor comprising two adjacent chains.

The device shown in FIG. 1 and FIG. 2 comprises a frame 1, accommodating two endless conveyors 2 and 3. The conveyors, which are located side by side, are guided at the front and at the rear around wheels adapted to rotate about upwardly directed rotary shafts. The foremost wheels, located nearest the ground, are spaced apart by such a distance that the front ends of the opposite portions of the two endless conveyors 2 and 3 are at a given distance from each other, the opposite portions being guided so that they are parallel to each other and comparatively near each other for the major part of their length, as will be apparent from FIG. 1. From FIG. 2 it will furthermore be seen that the two conveyors are inclined upwardly in the direction from the front to the rear of the device. Near the front ends of the two conveyors guide discs 4 are provided, which are also adapted to rotate about upwardly inclined rotary shafts. Above the two conveyors 2 and 3 guide means including gutter-shaped screening plates 5 and 6 respectively are arranged on the frame, the opposite rims of which are spaced apart by a given distance A so that a slot 7 is formed between the plates 5 and 6.

It will be seen from FIG. 2 that the screening plates 5 and 6, which are also inclined upwardly in the direction from the front to the rear of the device, are at a larger angle to the horizontal than the two endless conveyors 2 and 3 so that the distance between the screening plates 5 and 6 and the conveyors 2 and 3 gradually increases. Near the rear of the device two horizontal shafts 8 and 9 extend transversely of the direction of length of the conveyors, around which shafts 8 and 9 an endless conveyor belt 10 is guided. The conveyor belt 10 has fastened to it plates 11 of elastic material. Beneath the conveyor belt 10 a cutting member 12 is arranged.

The device can be coupled by means of coupling members (not shown), for example, with the side of a tractor or a similar prime mover, for moving it in operation in the direction of the arrow A. The various parts of the device can be driven by a power take-off shaft of the tractor via an auxiliary shaft 13, which is coupled with a gear box 14 secured to the frame.

One form of endless conveyor is shown in detail in FIGS. 3 and 4. From these Figures it will be apparent, that the endless conveyor is formed by a chain of links 15, which are pivoted to each other by means of bolts or pins 16. Between the links rollers 17 are freely rotatable about the bolts 16. About each of the bolts 16 a U-shaped bracket 18 is freely pivotable, the limbs thereof being located one on each side of the chain. Bushings 19 are fastened to the limbs of each bracket 18, the bolt 16 being passed through them, whilst the links 15 of the chain and the roller 17 are enclosed between them.

To the two ends of the bracket 18 are welded plates 20, connecting the limbs with each other and being at right angles to the web of the bracket and projecting over said web over a given distance.

The side of the web of the bracket 18 remote from the links supports a tine 21, fastened to the bracket and made of rubber, or similar elastic material, and being integral with the oppositely extending mounting lugs 22. The ends of the lugs 22 are in contact with the top ends of the plates 20. With the aid of clamping plates 23 and screws (not shown) the lugs 22 are clamped to the bracket 18. The frame is furthermore provided with guide strips or rails 24, along which the rollers 17 can run.

In operation the device is moved across the field in the direction of the arrow A and the two endless conveyors 2 and 3 are driven so that their opposite portions move in a direction opposite to that of the arrow A. The conveyor belt 10 is driven so that the lower portion of the conveyor belt moves towards the rear. The device is moved across the field so that the stems of the cabbages or similar crops are guided between the opposite faces of the guide discs 4 and into the conveyors. The stems are thus gripped between the tines of the opposite portions of the conveyors, whilst the cabbage itself slides along the topsides of guide means or the gutter-shaped plates 5 and 6. Since the conveyors are inclined upwardly and rearwardly the stems will gradually be pulled out of the soil. The conveyors are preferably driven so that the rate of rearward movement of the opposite portions of the conveyors is equal to the rate of movement of the device over the ground so that the stems are pulled perpendicularly out of the soil. Since, in addition, the gutter-shaped screening plates 5 and 6 are slightly steeper than the endless conveying members 2 and 3, the stem will be pulled in a straight line and be passed in this position to the cutter 12, which severs it from the cabbage head. The severed cabbage head is displaced to the rear with the aid of the conveyor belt 10 and collected for further transport. The severed stems may be dropped back to the ground.

FIG. 3 shows that the ends of the plates 20 are in contact with the links of the chain, where the chain is straight, at points located between the pivotal shafts 16. The plates 20 thus form stops, which prevent the chains from sagging in the downward direction as viewed in FIG. 3. I thereby avoid the parallel chain portions being pushed away from each other by stems jammed between the tines of the chains, which would loosen their grip on the stems. Such movements away from each other are furthermore counteracted by guiding the rollers 17 along rails or strips 24. FIG. 3 shows furthermore that the conveyors can be readily guided round a wheel or the like without the tines impeding such a movement, since the tines are adapted to pivot independently of each other about the pivotal shafts 16 with respect to the endless conveyor formed by the chain. Owing to the relative movements of the various parts of the endless conveyors and the tines relative to each other any sticking dirt or soil is readily loosened. If a tine 21 is damaged, it can be readily replaced by a new one independently of the other tines. In the event of wear of parts of the endless conveyors and/or of their tines, the various parts can be readily replaced independently of each other. The links may have a greater length if desired, so that a proportionally smaller number of pivotal points is required. A further advantage resides in that different profiles for the tines 21 can be used, in accordance with the crop to be harvested, the further parts of the device remaining the same.

FIG. 5 shows a second form of endless conveyor. The brackets 25 used in this embodiment, to which the tines 21 are fastened, are slightly wider than the brackets 18. By means of the bolts 26 two adjacent chains 27 and 28 are coupled with the brackets 25. The rollers of the chains 27 and 28 run along a broad supporting rail or strip 29. By using two adjacent chains 27 and 28, the rollers of both of which are supported, the risk of tilting of the endless conveying members due to forces exerted on the tines is substantially reduced.

What I claim is:

1. A device for harvesting cabbages and suchlike crops growing on stems, the device comprising a frame carrying two endless conveyors arranged side by side and adapted to cooperate with each other and being inclined upwardly in a direction from the front to the rear of the device, said conveyors being provided with interengaging tines to grip the stems, said tines being mounted on endless chains such that the tines are independently pivotal with respect to each other and the links of the chains, guide means for the crop heads being arranged above the conveyors and including means forming a slot immediately above said conveyor through which the stems may extend, said guide means being at a greater angle to the horizontal than the conveyors to insure that the heads will engage said guide means, and cutting means arranged substantially level with the lower side of the guide means near the rear end of said guide means to remove the stems immediately below the heads.

2. A device as claimed in claim 1 in which the conveyors comprise endless chains.

3. A device as claimed in claim 2 in which independently pivotable tines are pivoted to the chains at pivotal joints between the chain links.

4. A device as claimed in claim 3 in which the tines are provided with stops which contact the links of the chain along straight portions of the chain.

5. A device as claimed in claim 4 in which the chain is provided with rollers adapted to run along guides provided on the frame on the side of the chain remote from the tines.

6. A device as claimed in claim 4 in which the tines are coupled with the chain by means of U-shaped brackets.

7. A device as claimed in claim 6, in which the tines are detachably secured to the brackets.

8. A device as claimed in claim 7 in which the tines are made of elastic material.

9. A device as claimed in claim 2 in which the distance between two consecutive pivotal shafts of a chain is at least substantially equal to the distance between two consecutive tines.

10. A device as claimed in claim 2 in which the two endless conveyors are formed by two adjacent chains both provided with rollers, whilst the frame comprises guide members for the rollers.

11. The device of claim 1 further including a pair of guide discs and means mounting said guide discs on inclined rotary shafts at the front of said frame, said guide discs directing crop heads onto said guide means.

* * * * *